UNITED STATES PATENT OFFICE.

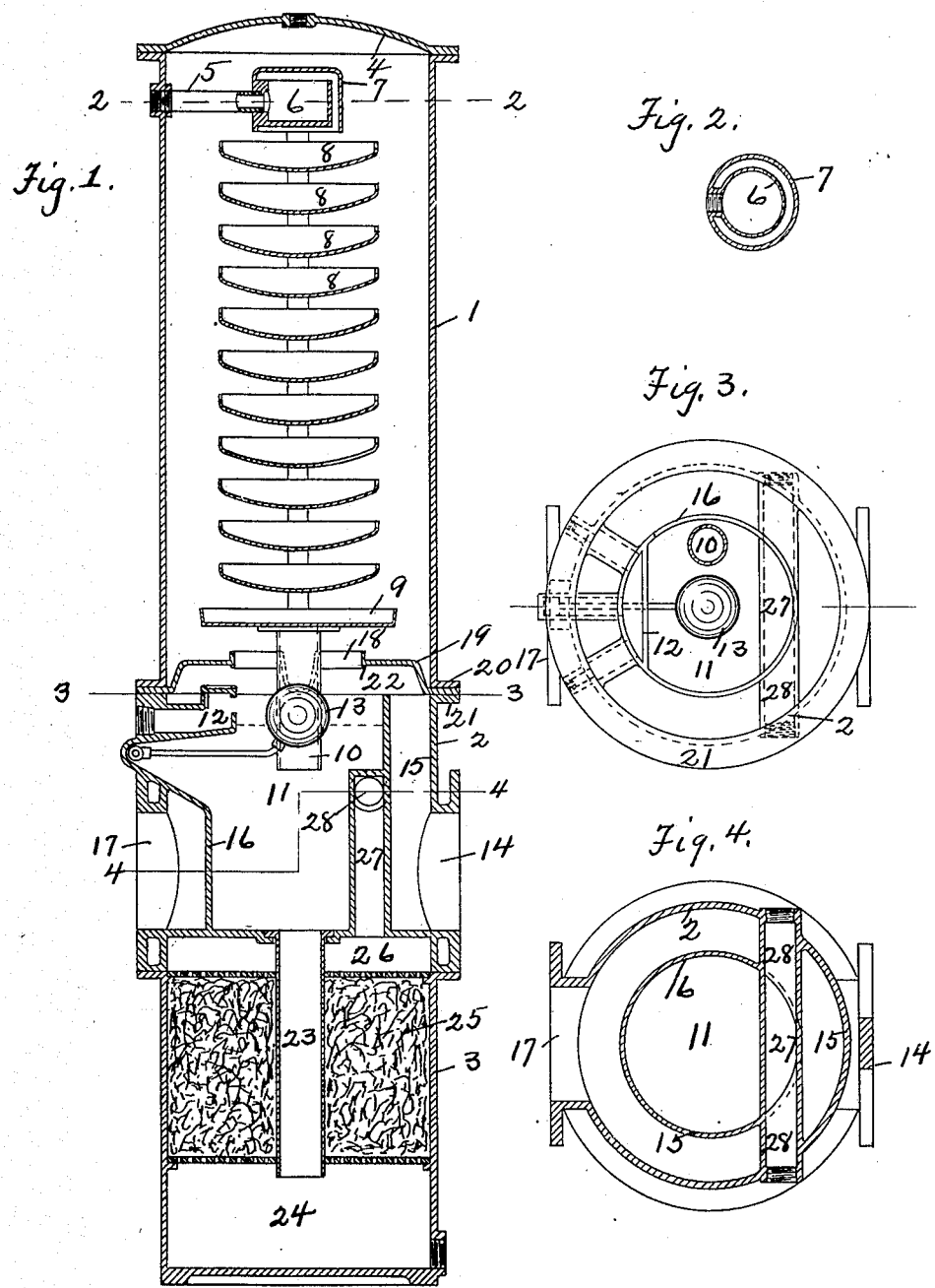

THOMAS E. DURBAN, OF ERIE, PENNSYLVANIA, ASSIGNOR TO ERIE CITY IRON WORKS, OF ERIE, PENNSYLVANIA, A CORPORATION OF PENNSYLVANIA.

WATER-HEATER.

No. 918,517.     Specification of Letters Patent.     Patented April 20, 1909.

Application filed May 23, 1908. Serial No. 434,504.

*To all whom it may concern:*

Be it known that I, THOMAS E. DURBAN, a citizen of the United States, residing at Erie, in the county of Erie and State of Pennsylvania, have invented new and useful Improvements in Water-Heaters, of which the following is a specification.

This invention relates to water heaters and consists in certain improvements in the construction thereof as will be hereinafter fully described and pointed out in the claims.

The invention is particularly adapted to what are known as open heaters and one of the objects of the invention is to so control the movement of the water that it is brought into close relation with the incoming steam at the point of the discharge of the water, so that the temperature of the water is raised to approximately that of the incoming steam.

Other features of the invention will appear from the specification and claims.

The invention is illustrated in the accompanying drawings as follows:

Figure 1 shows a central vertical section of the heater. Fig. 2 a section of the water-distributing nozzle on the line 2—2 in Fig. 1. Fig. 3 a section on the line 3—3 in Fig. 1. Fig. 4 a section on the line 4—4 in Fig. 1.

The heater case comprises the drip section 1, the inlet and over-flow section 2 and the filter section 3. The drip section is covered by the cap plate 4. Water enters by the pipe 5. It is carried into the cup 6. The cup 6 has the cover 7 which positively directs the flow of liquid into the upper receptacle 8. The receptacles are of ordinary construction, the water dropping from one to the other in direct contact with the steam, and passes from said receptacles to the lower receptacle 9. The pipe 10 carries the water from this receptacle to the over-flow chamber 11. The outlet or over-flow 12 opens into this chamber. The over-flow is controlled by the float 13, said float operating upon a valve (not shown) for controlling the over-flow passage.

Steam enters at 14 and passes into the chamber 15 surrounding the over-flow chamber 11, the chamber 15 being separated from the chamber 11 by the wall 16. A steam outlet is arranged at 17. Steam also passes from the chamber 15 through the opening 18 into the drip case where it is brought into immediate contact with the water. The opening 18 is arranged in the plate 19, this plate being secured between the flanges 20 and 21, on the bottom of the drip section and top of the over-flow section respectively. This plate 19 prevents any water that may condense on the walls of the drip case or reach them in any way from passing directly into the chamber 15. The condensation or drip on the plate 19 over-flows through the opening 18. A small bead or shoulder is arranged on the underside of the plate 19 surrounding the plate 18 to prevent the water following the plate to a point over the chamber 15.

The water passes through the pipe 23 to a chamber 24 in the bottom of the filter section 3, and then ascends through the filter 25 surrounding the pipe 23 to a chamber 26 above the filter. A discharge passage 27 extends from the chamber 26 and leads into a cross passage 28 extending to both sides of the case. In practice only one of these ends are used, but both are usually provided so as to add to the convenience with which the discharge may be connected.

The passage 27, it will be noted, is in the direct path of entering steam, so that it is exposed to the heat of the steam at its highest temperature. The result is, that the temperature of the water is raised to approximately that of steam. In heaters of this type heretofore made it has been common to arrange the discharge pipe at a point immediately above the filter, and these heaters are very much less efficient as to the final temperature of the water, than the heater forming the substance of this invention. It will also be noted that the passage 27 extends upwardly in contact with the water in the over-flow chamber or well. The water in this chamber is of a higher temperature than the water after it leaves the filter, the water losing some of its heat in its passage through the filter.

What I claim as new is.

1. In a water heater, the combination of a case with a steam inlet; and a water system in the case comprising an inlet, water passages carrying the water downwardly from the inlet in direct contact with steam in the case, and a discharge passage immediately adjacent to the steam inlet in the current of the incoming steam.

2. In a water heater, the combination of a case with a steam inlet; and a water system in the case comprising an inlet, water passages carrying the water downwardly from the inlet to a point below the steam inlet and then upwardly in a discharge passage immediately adjacent to the steam inlet in the current of the incoming steam.

3. In a water heater, the combination of a case with a steam inlet; and a water system in the case comprising a water inlet, water passages carrying the water downwardly from the inlet in direct contact with the steam in the case to a point below the steam inlet, and then upwardly in a discharge passage immediately adjacent to the steam inlet in the current of the incoming steam.

4. In a water heater, the combination of a case with a steam inlet; a filter below the steam inlet; and a water system in the case comprising an inlet, water passages carrying the water downwardly from the water inlet in direct contact with the steam in the case to beneath the filter through which the water passes ascending and from the filter to the level of and adjacent to the steam inlet in the current of the incoming steam.

5. In a water heater, the combination of a case with a steam inlet; a filter below the steam inlet; and a water system in the case comprising an inlet, water passages carrying the water downwardly from the water inlet in direct contact with the steam in the case to beneath the filter through which the water passes ascending and from the filter to a point higher than the steam inlet in the current of the incoming steam.

6. In a water heater, the combination of a case with a steam inlet; a filter in the case; and a water system in the case comprising a water inlet, water passages carrying the water downwardly in direct contact with the steam, and through the filter to a discharge passage, said discharge passage being immediately adjacent to the steam inlet in the current of the incoming steam.

7. In a water heater, the combination of a case comprising a drip section, an inlet and over-flow section and a filter section; and a water system comprising an inlet at the top of the drip section, drip means in the drip section, an interior over-flow chamber in the over-flow section, passages leading therefrom through the filter to below the filter, and a discharge pipe from above the filter arranged immediately adjacent to the steam inlet in the current of the incoming steam.

8. In a water heater, the combination of a case comprising a drip section, an inlet and over-flow section and a filter section, the inlet section having a steam inlet; a filter in the filter section; and a water system comprising an inlet at the top of the drip section drip means in the drip section, an interior over-flow chamber in the over-flow section, passages leading therefrom through the filter to below the filter, and a discharge passage extending upwardly from the filter adjacent to the over-flow chamber and immediately adjacent to the steam inlet in the current of the incoming steam.

9. In a water heater, the combination of a case comprising the drip section, an inlet and over-flow section and a filter section; a filter in the filter section, an interiorly arranged over-flow chamber in the over-flow section and a steam chamber arranged between the walls of overflow section and the over-flow chamber; and a discharge pipe leading from above the filter upwardly along the walls of the over-flow chamber and immediately adjacent to the steam inlet in the current of the incoming steam.

10. In a water heater, the combination of a case comprising a drip section and an over-flow section, said over-flow section having an interiorly arranged over-flow chamber with a surrounding steam chamber; a plate between said sections having a central opening adapted to prevent a passage of liquid from the drip chamber to the steam chamber surrounding the over-flow chamber, and having an opening for permitting the passage of steam from the steam chamber to the drip chamber, and a passage for water from the drip chamber to the over-flow chamber.

11. In a water heater, the combination of a case having a filter section and a well above the filter section; means for admitting water and steam to the case; and a discharge passage extending upwardly in contact with the water in the well and conveying the water after it leaves the filter toward the discharge.

In testimony whereof I have hereunto set my hand in the presence of two subscribing witnesses.

THOMAS E. DURBAN.

Witnesses:
J. D. McLaughlin,
K. Kane.